United States Patent
Kato

(10) Patent No.: US 12,002,158 B2
(45) Date of Patent: Jun. 4, 2024

(54) INFORMATION PROCESSING APPARATUS, INFORMATION PROCESSING METHOD AND INFORMATION PROCESSING SYSTEM

(71) Applicant: SONY GROUP CORPORATION, Tokyo (JP)

(72) Inventor: Takaaki Kato, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 130 days.

(21) Appl. No.: 17/635,085

(22) PCT Filed: Jul. 7, 2020

(86) PCT No.: PCT/JP2020/026527
§ 371 (c)(1),
(2) Date: Feb. 14, 2022

(87) PCT Pub. No.: WO2021/033443
PCT Pub. Date: Feb. 25, 2021

(65) Prior Publication Data
US 2022/0292769 A1  Sep. 15, 2022

(30) Foreign Application Priority Data

Aug. 21, 2019  (JP) .................................. 2019-151196

(51) Int. Cl.
*G06T 17/10*  (2006.01)
*G06Q 20/38*  (2012.01)
*G06V 20/17*  (2022.01)

(52) U.S. Cl.
CPC ........... *G06T 17/10* (2013.01); *G06Q 20/389* (2013.01); *G06V 20/17* (2022.01)

(58) Field of Classification Search
CPC ....... G06T 17/10; G06T 17/00; G06Q 20/389; G06Q 20/065; G06Q 50/10; G06V 20/17;
(Continued)

(56) References Cited

U.S. PATENT DOCUMENTS 10,025,447 B1 * 7/2018 Dixit ...................... G06F 3/011
10,663,303 B2 * 5/2020 Lawrenson ............ G01C 21/30
(Continued)

FOREIGN PATENT DOCUMENTS

CN    110383791 A    10/2019
JP    2016-208347 A  12/2016
(Continued)

OTHER PUBLICATIONS

International Search Report and Written Opinion of PCT Application No. PCT/JP2020/026527, dated Sep. 24, 2020, 08 pages of ISRWO.

*Primary Examiner* — Vijay Shankar
(74) *Attorney, Agent, or Firm* — CHIP LAW GROUP

(57) ABSTRACT

To provide an information processing apparatus, an information processing method, and an information processing system that make it possible to grasp a state of a certain region. An information processing apparatus includes an image acquisition section, a three-dimensional model generator, and a block generator. The image acquisition section acquires image information that includes image data and position information that are associated with each other, the position information being information regarding a position at which the image data is acquired. The three-dimensional model generator generates a three-dimensional model using the image information. The block generator generates a new block that is to be coupled to a blockchain that is formed by blocks being coupled, each block recording therein the image information used to generate the three-dimensional model.

6 Claims, 8 Drawing Sheets

(58) Field of Classification Search
CPC ............... G06V 10/761; G06V 10/764; G06V 2201/10; G06V 20/00; H04L 9/0637; H04L 9/50
See application file for complete search history.

(56) References Cited

U.S. PATENT DOCUMENTS

| | | | |
|---|---|---|---|
| 10,677,607 B2* | 6/2020 | Xia | .................. H04L 9/0643 |
| 2018/0165585 A1* | 6/2018 | Saxena | .............. G06Q 30/0269 |
| 2019/0301883 A1* | 10/2019 | Xia | .................. G06Q 30/02 |
| 2023/0024672 A1* | 1/2023 | Bonutti | .................. G06F 21/602 |

FOREIGN PATENT DOCUMENTS

| | | |
|---|---|---|
| JP | 2017-138109 A | 8/2017 |
| JP | 2020-512614 A | 4/2020 |
| SG | 11201907107 W | 8/2019 |
| WO | 2019/072311 A2 | 4/2019 |

* cited by examiner

INFORMATION PROCESSING APPARATUS, INFORMATION PROCESSING METHOD AND INFORMATION PROCESSING SYSTEM

CROSS REFERENCE TO RELATED APPLICATIONS

This application is a U.S. National Phase of International Patent Application No. PCT/JP2020/026527 filed on Jul. 7, 2020, which claims priority benefit of Japanese Patent Application No. JP 2019-151196 filed in the Japan Patent Office on Aug. 21, 2019. Each of the above-referenced applications is hereby incorporated herein by reference in its entirety.

TECHNICAL FIELD

The present technology relates to an information processing apparatus, an information processing method, a program, and an information processing system using a blockchain.

BACKGROUND ART

Patent Literature 1 discloses analyzing an aerial image of a survey-target land that is captured in, for example, a construction site using a drone (a pilotless plane), and generating, for example, 3D data that indicates a landform of the land.

CITATION LIST

Patent Literature

Patent Literature 1: Japanese Patent Application Laid-open No. 2017-138109

DISCLOSURE OF INVENTION

Technical Problem

For example, a state in a construction site is changed over time with respect to, for example, the number of materials, a space to keep the materials, earth and sand, and a shape of a building that is being constructed. It is desirable that a state change be monitored to be managed on a regular basis in order to perform construction work accurately and rapidly.

It is an object of the present technology to provide an information processing apparatus, an information processing method, a program, and an information processing system that make it possible to grasp a state of a certain region.

Solution to Problem

In order to achieve the object described above, an information processing apparatus according to an embodiment of the present technology includes an image acquisition section, a three-dimensional model generator, and a block generator.

The image acquisition section acquires image information that includes image data and position information that are associated with each other, the position information being information regarding a position at which the image data is acquired.

The three-dimensional model generator generates a three-dimensional model using the image information.

The block generator generates a new block that is to be coupled to a blockchain that is formed by blocks being coupled, each block recording therein the image information used to generate the three-dimensional model.

According to such a configuration, pieces of information are chronologically recorded in the form of a chain using a blockchain, and this results in difficulty in tracing back for falsification. This makes it possible to generate a highly reliable three-dimensional map.

An image use determination section that verifies whether the image information is to be approved as a transaction may be further included, and the three-dimensional model generator may generate a three-dimensional model using the image information approved as a transaction.

The image use determination section may determine whether the image information approved as a transaction is to be used to generate the three-dimensional model.

On the basis of a degree of similarity of use-determination-target image data to image data used for the generation of a three-dimensional model, the image use determination section may determine whether the use-determination-target image data is to be used to generate the three-dimensional model.

The image use determination section may classify a plurality of the pieces of image information using the pieces of position information.

The three-dimensional model generator may generate the three-dimensional model using the plurality of the pieces of image information classified using the pieces of position information.

In order to achieve the object described above, an information processing method according to an embodiment of the present technology includes acquiring unauthenticated image information that includes image data and position information that are associated with each other, the position information being information regarding a position at which the image data is acquired; generating a three-dimensional model using the image information; and generating a new block that is to be coupled to a blockchain that is formed by blocks being coupled, each block recording therein the image information used to generate the three-dimensional model.

In order to achieve the object described above, a program according to an embodiment of the present technology causes an information processing apparatus to perform a process including acquiring image information that includes image data and position information that are associated with each other, the position information being information regarding a position at which the image data is acquired; generating a three-dimensional model using the image information; and generating a new block that is to be coupled to a blockchain that is formed by blocks being coupled, each block recording therein the image information used to generate the three-dimensional model.

In order to achieve the object described above, an information processing system according to an embodiment of the present technology includes a plurality of information processing apparatuses.

The information processing apparatus includes a three-dimensional model generator that generates a three-dimensional model using image information that includes image data and position information that are associated with each other, the position information being information regarding a position at which the image data is acquired; and a block generator that generates a new block that is to be coupled to a blockchain that is formed by blocks being coupled, each block recording therein the image information used to generate the three-dimensional model.

MODE(S) FOR CARRYING OUT THE INVENTION

[Outline of Information Processing System]

An information processing system according to embodiments of the present technology will be described with reference to FIG. 1.

Figure 1:
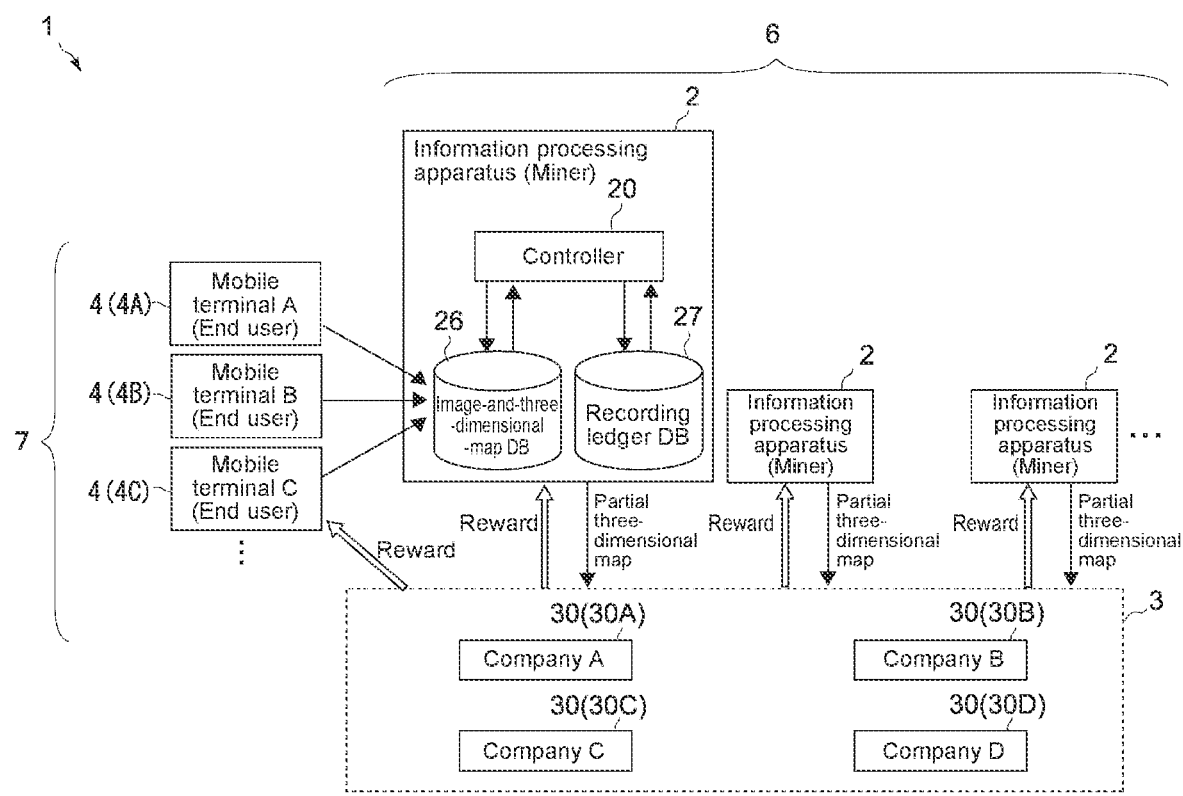
FIG. 1 schematically illustrates a configuration of an information processing system.

FIG. 1 schematically illustrates a configuration of an information processing system 1.

In the information processing system 1 according to the present embodiment, a three-dimensional map of, for example, a certain municipal region is generated, and the three-dimensional map is available to, for example, a construction company and a company that provides a game using a three-dimensional map. Such a plurality of companies having in common the use of a three-dimensional map of a certain region may make an alliance to form a group.

A three-dimensional map is a three-dimensional model that includes geospatial information.

In the information processing system 1, a three-dimensional map is generated and updated by a plurality of information processing apparatuses (miners) on the basis of a plurality of images provided by an unspecified number of image providers (end users). An image used to generate a three-dimensional map is recorded using a blockchain.

For example, when a construction company that corresponds to a user of a three-dimensional map checks a three-dimensional map updated as necessary, this enables the construction company to precisely grasp, for example, a state in a construction site with respect to, for example, the number of materials, a space to keep the materials, and a state of earth and sand. Further, for example, a company that provides a game can make use of a three-dimensional map for, for example, creation of a game using a three-dimensional map.

In the information processing system 1 according to the present embodiment, a miner receives a reward for generating a three-dimensional map from a user of the three-dimensional map, and an end user receives a reward for providing an image from the user of the three-dimensional map. The rewards will be described later.

As illustrated in FIG. 1, the information processing system 1 includes a miner group 6 that includes a plurality of information processing apparatuses (miners) 2, a group 3 that includes a plurality of companies 30A to 30D having made an alliance, and an end user group 7 that includes a plurality of mobile terminals (end users) 4.

In FIG. 1, mobile terminals are denoted by reference numerals 4A to 4C to distinguish the respective mobile terminals. However, in the following description, the mobile terminal is referred to as the mobile terminal 4 when there is no need to distinguish between the mobile terminals. For convenience, FIG. 1 illustrates three mobile terminals 4, four companies that make an alliance, and three information processing apparatuses (miners) 2. However, the respective numbers are not limited thereto.

The mobile terminals 4 are carried by an unspecified number of end users. The end user is an image provider providing data of an image of a region of which a three-dimensional map is to be generated, and is, for example, a general consumer. The end user can upload image information regarding an image captured using the mobile terminal 4 to an image-and-three-dimensional-map database (hereinafter referred to as an image-and-three-dimensional-map DB) 26 described later.

The mobile terminal 4 will be described in detail later.

The information processing apparatuses 2 of the plurality of information processing apparatus 2 can perform peer-to-peer (P2P) communication with each other. Further, each information processing apparatus 2 can communicate with the mobile terminal 4.

The information processing apparatus 2 performs a verification operation that includes verifying an unauthenticated image uploaded to the image-and-three-dimensional-map DB 26 and determining whether to approve the image as a transaction. Data of an image approved as a transaction is image data that can be used to generate a three-dimensional map, and is image data that can be a compensation for providing image data.

Further, the information processing apparatus 2 generates a three-dimensional map using an image approved as a transaction.

Furthermore, the information processing apparatus 2 performs mining processing in order to record, using a blockchain, an image used at the time of generating a three-dimensional map. In other words, the information processing apparatus 2 is a miner.

Moreover, the information processing apparatus 2 stores, in the image-and-three-dimensional-map DB 26, respective portions (respective partial three-dimensional maps) of three-dimensional maps respectively generated by the information processing apparatus 2 and another information processing apparatus 2.

The information processing apparatus 2 will be described in detail later.

The group 3 includes the plurality of companies 30A to 30D. The respective companies 30A to 30D can use a three-dimensional map. Each of the companies 30A to 30D acquires a partial three-dimensional map stored in the information processing apparatus (miner) 2, and includes an information processing apparatus (not illustrated) that performs integration to obtain a single three-dimensional map.

The group 3 pays a reward to a miner corresponding to an owner of the information processing apparatus 2 generating a three-dimensional map, and pays a reward to an end user corresponding to an image provider corresponding to a user of the mobile terminal 4.

A reward is paid to a miner, for example, when a three-dimensional map is updated. More specifically, a reward is paid to a miner that generates a three-dimensional map using an image, becomes the first to find a nonce, and generates a block that is coupled to a blockchain.

Further, a reward is paid to an end user, for example, when provided image data is used when a three-dimensional map is generated.

Next, the mobile terminal 4 and the information processing apparatus 2 are described with reference to FIG. 2.

Figure 2:
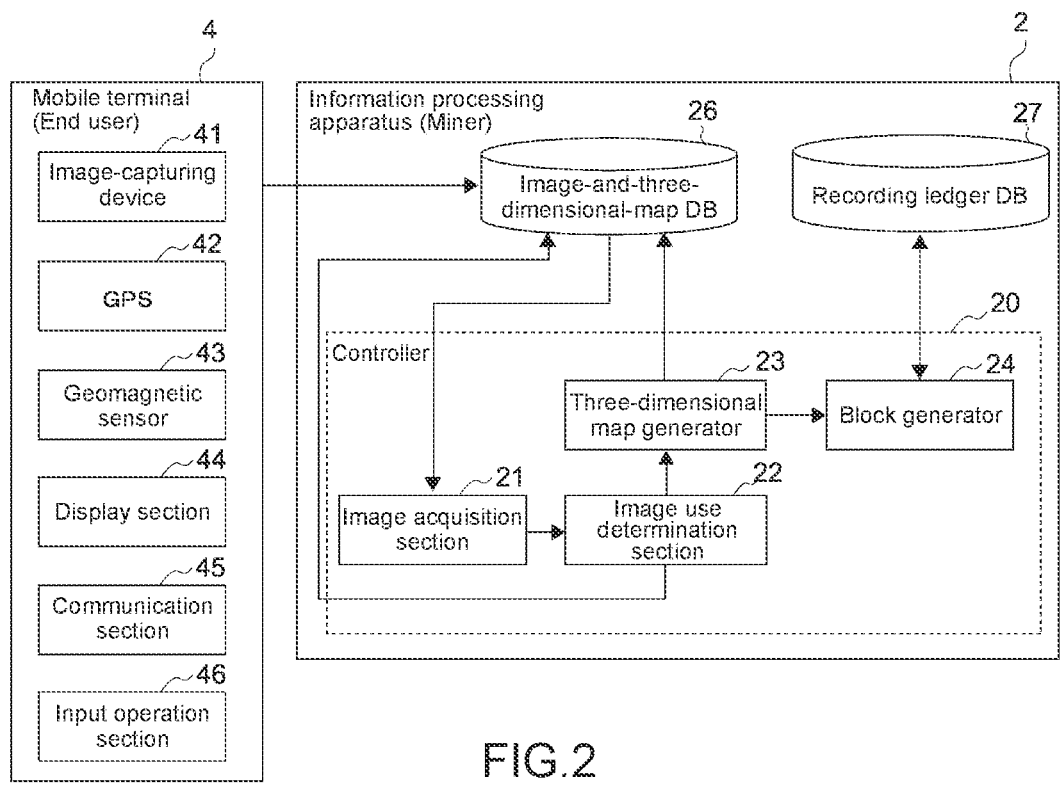
FIG. 2 is a block diagram illustrating an example of configurations of an information processing apparatus and a mobile terminal that are part of the information processing system.

FIG. 2 is a block diagram illustrating an example of configurations of the mobile terminal 4 and the information processing apparatus 2 that are part of the information processing system 1.

[Mobile Terminal (End User)]

An electronic apparatus of an end user may be a mobile terminal such as a smartphone or a personal digital assistant (PDA), or may be a digital camera, a digital video, or the like. Any electronic apparatus that includes at least an image-capturing section and a position acquisition section, and can upload image data and position information to the image-and-three-dimensional-map DB 26 directly or indirectly using another information terminal, may be used, the image data and the position information being respectively acquired by the image-capturing section and the position acquisition section. An example of using the mobile terminal 4 such as a smartphone as an electronic apparatus of an end user is described in the present embodiment. Further, here, image information is described as an example, but video information may be used.

An application program has been downloaded to the mobile terminal 4 in advance, the application program making it possible to receive a reward when image information regarding an image that is captured using the mobile terminal 4 is uploaded to the image-and-three-dimensional-map DB 26 and when the image information is used to generate three-dimensional map.

As illustrated in FIG. 2, the mobile terminal 4 includes an image-capturing device 41 corresponding to an image-capturing section, the Global Positioning System (GPS) 42 corresponding to a position information acquiring section, a geomagnetic sensor 43 corresponding to a pose information acquiring section, a display section 44, a communication section 45, and a input operation section 46.

The image-capturing device 41 acquires image data by an image-capturing operation being performed by an end user.

The GPS 42 detects position information regarding a position of the mobile terminal 4. The GPS 42 measures the position of the mobile terminal 4 on the basis of triangulation using a radio wave from an artificial satellite that orbits the earth. The position information indicates the position of the mobile terminal (end user) 4 when image data is acquired, and the position information and the image data are associated with each other. Information acquired by the GPS 42 includes not only position information such as the longitude, the latitude, and the altitude measured using an above-sea level as a reference, but also date-and-time information such as a date and a time stamp.

The geomagnetic sensor 43 detects pose information regarding a pose of the mobile terminal 4. The pose information is an orientation of a captured image in the true bearing, and is image-capturing direction information regarding an image-capturing direction viewed from the mobile terminal 4.

The display section 44 displays, for example, an image captured using the image-capturing device 41. For example, the display section 44 includes an image display panel such as a liquid crystal display or an organic EL display.

The communication section 45 communicates with the information processing apparatus 2 through a wireless network. The communication section 45 transmits image information including image data and position information to the information processing apparatus 2. The transmitted image information is stored in the image-and-three-dimensional-map DB 26.

The input operation section 46 includes, for example, a key, a button, and a touch panel. An upload and the like of an image are performed by an input operation being performed by an end user using the input operation section 46.

An end user having the mobile terminal 4 can provide image information (image data with position information) regarding an image acquired by the end user, and can receive a reward by the image information being used when a three-dimensional map is generated.

Further, image information acquired by the mobile terminal 4 and uploaded to the image-and-three-dimensional-map DB 26 may include mobile-terminal information (end-user information) in addition to image data and position information, such that which of the mobile terminals 4 has acquired the image associated with the image data and the position information, can be specified. This results in being able to specify an end user having provided an image used to generate a three-dimensional map, and in being able to pay a reward to the end user having contributed toward generating the three-dimensional map.

Further, the uploaded image information may include date-and-time information associated with the image data, the date-and-time information being acquired by the GPS 42 and indicating a date and time when image-capturing is performed. A timing at which an upload is performed by the mobile terminal 4 may be different from a timing at which the image data is acquired. Thus, when the date-and-time information is included in the image information, the image data can be classified into a plurality of groups at the time of generating a three-dimensional map, using the date-and-time information in addition to the position information. The classification will be described later. When the date-and-time information is included, the image data is chronologically stored in the image-and-three-dimensional-map DB 26 on the basis of the date-and-time information.

[Information Processing Apparatus (Miner)]

As illustrated in FIG. 2, the information processing apparatus 2 includes a controller 20, the image-and-three-dimensional-map DB 26, and a recording ledger DB 27.

The information processing apparatus 2 includes a program used to perform use determination processing on image data, three-dimensional map generation processing using image information, and mining processing for recording, using a blockchain, image data used when a three-dimensional map is generated. The image use determination processing includes a verification operation and a determination operation, the verification operation being an operation of determining whether to approve image data as a transaction, the determination operation being an operation of determining whether to use the image data for generating a three-dimensional map. The program is installed on a storage (not illustrated) in advance.

The image-and-three-dimensional-map DB 26 stores therein image information uploaded by the mobile terminal (end user) 4, a partial three-dimensional map generated by the information processing apparatus 2 (miner) including the image-and-three-dimensional-map DB 26, and a partial three-dimensional map generated by another information processing apparatus (miner). The partial three-dimensional map stored in the image-and-three-dimensional-map DB 26 may be obtained by once performing integration to obtain an entire three-dimensional map (three-dimensional model) and then dividing the entire three-dimensional map into a plurality of pieces of partial information. The partial three-dimensional map obtained by once performing integration to obtain an entire three-dimensional map and then dividing the entire three-dimensional map into pieces of partial information, may be distributed to the respective information processing apparatuses (miners).

Image information includes at least position information and image data that are associated with each other, and, in the present embodiment, the image information further includes end-user information that is associated with the at least position information and image data.

Using a blockchain, the recording ledger DB 27 stores therein image information used to generate a three-dimensional map. In the following description, data stored in the recording ledger DB 27 is referred to as blockchain data. The blockchain data stored in the recording ledger DB 27 is held in the same manner by all of the information processing apparatuses 2 participating in the generation of a three-dimensional map. The blockchain data is generated by the information processing apparatus (miner) 2 itself or another information processing apparatus (miner) 2, and is updated as necessary.

Figure 3:
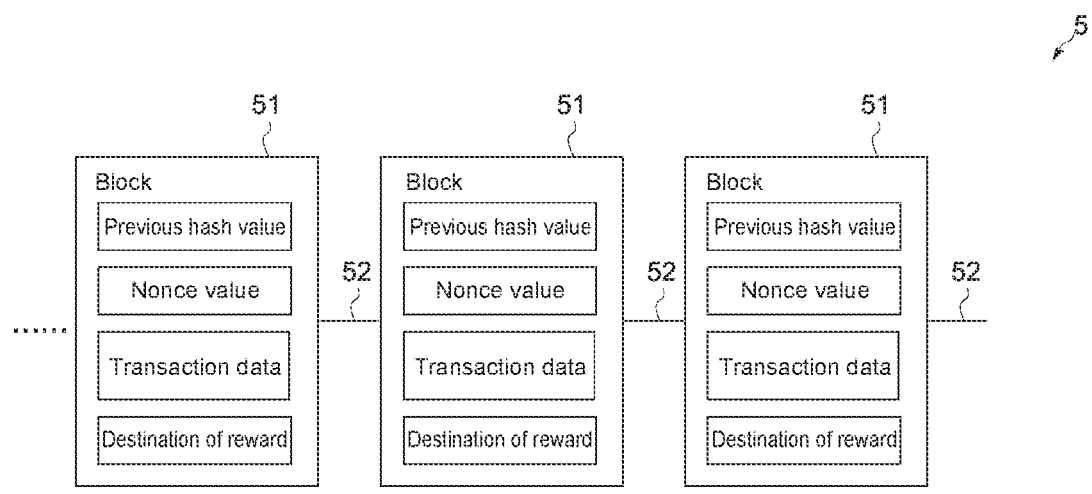
FIG. 3 is a diagram illustrating a blockchain.

FIG. 3 is a conceptual diagram of a blockchain 5. The blockchain 5 is formed by blocks 51 being coupled to each other through a chain 52. The block 51 stores therein transaction data, a nonce value, a hash value of a most recently coupled block, and a destination of a reward. This will be described in detail later. In the present embodiment, the transaction data is image information used when a three-dimensional map is generated, and is image data and position information that are associated with each other. The destination of a reward corresponds to miner information regarding a miner having found a nonce.

The blockchain data is a recording ledger of image information used when a three-dimensional map is generated.

The blockchain data includes information regarding a miner having contributed toward generating a three-dimensional map. Further, the blockchain data indirectly includes information regarding an end user having provided an image that has contributed toward generating a three-dimensional map, since the blockchain data includes image information used when a three-dimensional map is generated, and the image information stored in the image-and-three-dimensional-map DB 26 includes associated information regarding the mobile terminal 4 (end user information).

As described above, the blockchain data is a recording ledger of an image used when a three-dimensional map is generated, and is also a recording ledger of rewards that are paid to a miner and end user having contributed toward generating a three-dimensional map.

Note that the example in which transaction data stored in the block 51 is image data and position information that are associated with each other has been described above. However, the transaction data may include end-user information in addition to the image data and the position information.

Image data stored in the image-and-three-dimensional-map DB 26 is classified into two statuses that are a status of being authenticated (the verification operation has been performed) and a status of being unauthenticated (the verification operation has not been performed). An image use determination section 22 of the controller 20 that will be described later assigns the status of being authenticated to image data on which the verification operation of determining whether to approve the image data as a transaction has been performed, and assigns the status of being unauthenticated to image data on which the verification operation has not yet been performed. The image data assigned the status of being authenticated is classified into image data approved as a transaction and image data not approved as a transaction.

There is a plurality of information processing apparatuses (miners) 2 each including the recording ledger DB 27. The information processing apparatuses 2 of the plurality of information processing apparatuses 2 have blockchain data in common.

The controller 20 controls a series of processes performed when a three-dimensional map is generated.

The controller 20 includes an image acquisition section 21, the image use determination section 22, a three-dimensional map generator 23 corresponding to a three-dimensional model generator, and a block generator 24.

The image acquisition section 21 acquires image data assigned the status of being unauthenticated from the image-and-three-dimensional-map DB 26.

The image use determination section 22 performs a verification operation of determining whether to approve, as a transaction, the image data acquired by the image acquisition section 21. A result of the verification operation is transmitted to the image-and-three-dimensional-map DB 26 and stored in the image-and-three-dimensional-map DB 26.

The determination of whether to approve an image as a transaction is a determination of whether the image is suitable to generate a three-dimensional map. For example, an image with blown-out highlights, an image with blocked-up shadows, and a blurred image are images in which an image-capturing target appears unclearly, and are not suitable to generate a three-dimensional map. Thus, the image use determination section 22 does not approve these images as transactions.

For example, when image-capturing is performed in a place with intense sunlight or a place in which there is something bright such as white clothes, blown-out highlights in which the gradation in a bright portion is lost and an image becomes white may occur. The image use determination section 22 does not approve data of the image as a transaction when the number of blown-out-highlight pixels in which such blown-out highlights have occurred accounts for a specified percentage or more of the number of pixels included in the entirety of the image.

Further, when a portion of a screen is too dark, for example, at night or in the shade, or when there is a great contrast between light and shade in a screen, blocked-up shadows in which the gradation in a dark portion of a captured image is lost and the captured image becomes black may occur. The image use determination section 22 does not approve data of the image as a transaction when the number of blocked-up-shadow pixels in which such blocked-up shadows have occurred accounts for a specified percentage or more of the number of pixels included in the entirety of the image.

For example, the determination of a blown-out-highlight pixel and the determination of a blocked-up-shadow pixel using a brightness threshold, which are disclosed in Japanese Patent Application Laid-open No. 2008-148180, are used to detect a blown-out-highlight pixel and a blocked-up-shadow pixel. Then, when the number of blown-out-highlight pixels or the number of blocked-up-shadow pixels accounts for a specified percentage or more of the number of pixels included in the entirety of an image, data of the image is not approved as a transaction, and when the number of blown-out-highlight pixels or the number of blocked-up-shadow pixels does not account for the specified percentage or more of the number of pixels included in the entirety of an image, data of the image is approved as a transaction.

Further, for example, the technology disclosed in Japanese Patent Application Laid-open No. 2010-217954 can be used to detect blur, and the image use determination section 22 determines whether to approve image data as a transaction on the basis of a result of detecting a degree of blur.

Further, the image use determination section 22 classifies a plurality of pieces of image data approved as transactions into a plurality of groups on the basis of associated pieces of position information.

Here, the accuracy of a position that can be determined by the GPS 42 is a position accuracy of about several tens of meters to about several hundred meters. The use of position information associated with image data makes it possible to classify a plurality of pieces of image data into a plurality of groups, with, for example, pieces of image data including the same position information being classified into one group.

The image use determination section 22 outputs, to the three-dimensional map generator 23, groups obtained by the classification performed on the basis of position information. Since the three-dimensional map generator 23 generates a three-dimensional map using a plurality of pieces of image data in the respective groups obtained by the classification performed on the basis of position information, the three-dimensional map generator 23 can generate a three-dimensional map efficiently.

Furthermore, the image use determination section 22 may determine whether to use, when a three-dimensional map is generated, image data classified on the basis of position information.

For example, the image use determination section 22 may determine that image data that has a high degree of similarity to image data used at the time of generating a three-dimensional map is not to be used.

For example, when images of similar scenes are consecutively captured using a single mobile terminal, at the same position in the same image-capturing direction without the mobile terminal being moved, there may be very little variation between the captured images in statistical information such as a brightness histogram, an average brightness value, and a color distribution, and the captured images may have almost the same composition and may have a high degree of similarity. When there is such a plurality of pieces of image data having a high degree of similarity, all of the plurality of pieces of image data are not necessary to generate a three-dimensional map. In such a case, the image use determination section 22 determines that image data that has a high degree of similarity to image data used at the time of generating a three-dimensional map is to be approved as a transaction, but is not to be used to generate a three-dimensional map.

This makes it possible to prevent an end user from performing an excessive upload for the purpose of obtaining a reward. For example, there is a possibility that an end user will upload a plurality of pieces of image data having a high degree of similarity for the purpose of obtaining a reward if an end user providing image data is paid a reward according to the number of images uploaded, regardless of whether the image data is used when a three-dimensional map is generated. On the other hand, when, as described above, it is determined that a reward is to be paid for an image used to generate a three-dimensional map under the condition that image data that has a high degree of similarity to image data that has been used at the time of generating the three-dimensional map is not used, this makes it possible to prevent an end user from performing an excessive and unnecessary upload of an image for the purpose of obtaining a reward.

For example, whether the degree of similarity is high is determined by how much image data will contribute toward generating a three-dimensional map when the image data is added at the time of generating the three-dimensional map. More specifically, the determination can be performed according to, for example, the number of three-dimensional points increased at the time of generating a three-dimensional map when use-determination-target image data is added, compared to the case of comparison-target image data determined to be used when the three-dimensional map is generated. The degree of similarity can be determined to be low when the number of three-dimensional points increased is equal to or larger than a certain number, and the degree of similarity can be determined to be high when the number of three-dimensional points increased is smaller than the certain number.

Moreover, a brightness histogram, an average brightness, a color distribution, an image frequency, an edge strength, and the like may be acquired as reference parameters for each of the comparison-target image data and the use-determination-target image data, and the reference parameters of the comparison-target image data and the reference parameters of the use-determination-target image data may be compared to determine the degree of similarity.

Furthermore, a point of interest may be extracted for each of the comparison-target image data and the use-determination-target image data, and the point of interest of the comparison-target image data and the point of interest of the use-determination-target image data may be compared to determine the degree of similarity.

Further, the image use determination section 22 may determine that image data that has little similarity to image data used at the time of generating a three-dimensional map, is not to be used.

For example, the case in which two end users perform image-capturing at the same position, but the two end users perform image-capturing in opposite directions, that is, the image-capturing direction of one of the two end users is east and the image-capturing direction of another of the two end users is east, is discussed. In this case, even if images respectively captured by the two end users include the same position information, the captured images will be completely different, and there will be little similarity between pieces of data of the images. In other words, even in the case of a plurality of pieces of image data classified into the same group on the basis of position information, image-capturing directions for the plurality of pieces of image data may be opposites.

For example, the image use determination section 22 compares a plurality of pieces of image data including the same position information, and detects, for example, a landmark in common. Then, the image use determination section 22 determines that pieces of data of images in which the same landmark appears are to be used to generate a three-dimensional map that includes a landmark and surroundings of the landmark, and determines that the other pieces of data of images have little similarity and are not to be used to generate the three-dimensional map including the landmark and the surroundings of the landmark. Note that an image determined to not be used can be used to generate a three-dimensional map of another region.

Note that a group obtained by classification performed on the basis of position information may be further classified into a plurality of small groups by, for example, the above-described method using a landmark, and a three-dimensional model of a target region may be generated for each small group using image data that belongs to the small group.

Further, when the number of a plurality of pieces of image data included in a group obtained by classification performed on the basis of position information is equal to or smaller than a specified number, the image use determination section 22 may determine that there is not sufficient information to generate a three-dimensional map, and may determine that, at this point, the three-dimensional map is not to be generated using image data classified into the group.

As described above, the use of position information associated with image data makes it possible to narrow down image data to generate a three-dimensional map, and thus to perform processing efficiently.

Using a plurality of pieces of image data approved as transactions by the image use determination section 22 and determined by the image use determination section 22 to be used to generate a three-dimensional map, the three-dimensional map generator 23 estimates a position and an image-capturing direction of the mobile terminal 4 when each of the plurality of pieces of image data is acquired. After that, the three-dimensional map generator 23 generates and reconstructs a partial three-dimensional map on the basis of the plurality of pieces of image data. The reconstructed and updated partial three-dimensional map is stored in the image-and-three-dimensional-map DB 26.

A reward is paid to an end user having provided image data used to generate a three-dimensional map. In other words, whether to pay a reward to an end user is determined using a result of determination performed by the image use determination section 22.

Existing technologies may be used to generate a three-dimensional map using a plurality of pieces of image data. For example, an image-based 3D modeling method in which three-dimensional information included in one or more images or time-series images is restored to generate a three-dimensional model, may be used. Image-based three-dimensional modeling is an approach in which an optical image of a three-dimensional scene is mapped onto a two-dimensional plane to obtain image data, and inverse mapping from the two-dimensional image data to the three-dimensional scene is performed to restore original information regarding the three-dimensional scene. For example, there are a model-based 3D modeling method, a 3D modeling method using a stereo measurement, and a 3D shape restoring method using time-series images.

Figure 4:
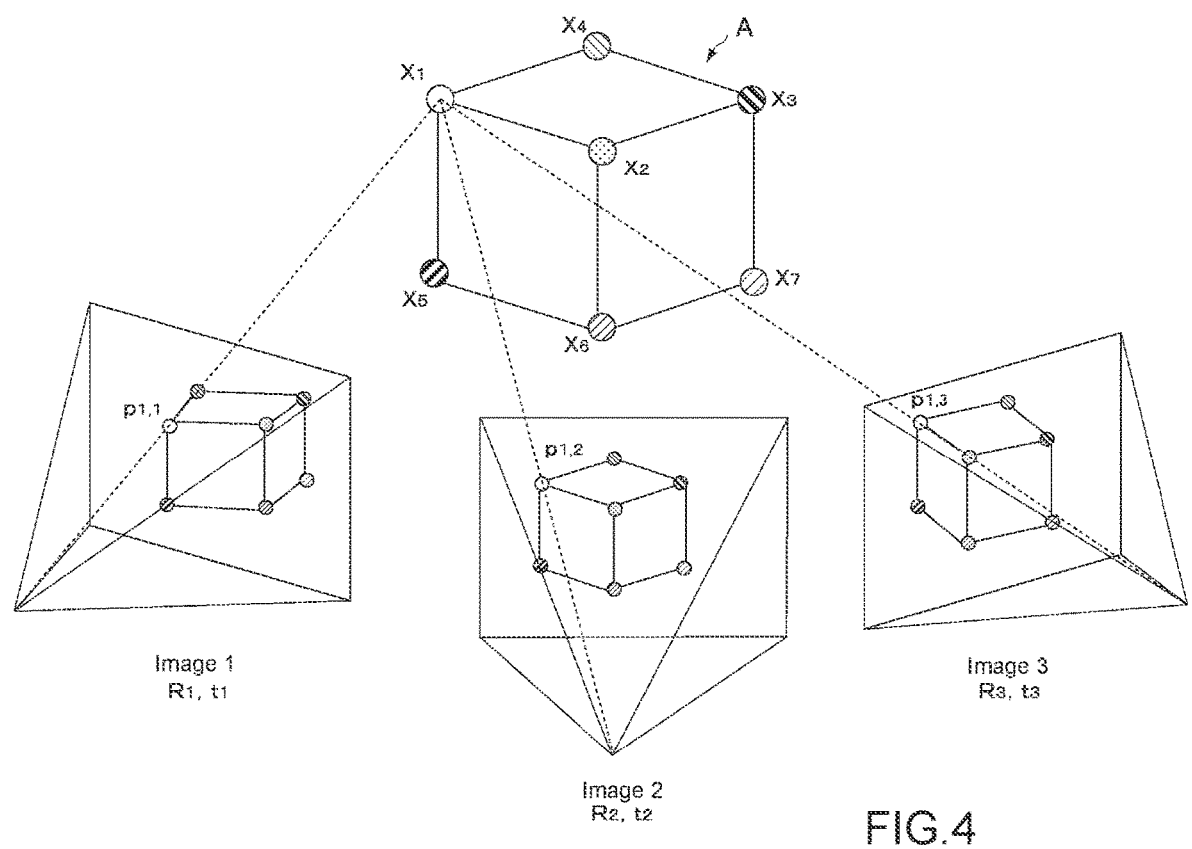
FIG. 4 is a conceptual diagram illustrating a generation of a three-dimensional model from a plurality of images.

FIG. 4 is a conceptual diagram illustrating an example of generating a three-dimensional model using a plurality of images. As illustrated in FIG. 4, image-capturing positions and image-capturing directions at the time of acquiring a plurality of images including an image 1, an image 2, and an image 3, are estimated from the respective images, and a three-dimensional model of an object A is generated, the object A being an object that satisfies all of the image 1, the image 2, and the image 3 and of which an image can be captured from the respective estimated image-capturing positions.

Reference is made to FIG. 3. The block generator 24 performs block generation processing that includes generating a new block 51 that is to be coupled to the blockchain 5, and coupling the new block 51 to the blockchain 5. Further, the block generator 24 verifies whether a nonce value found by another information processing apparatus (miner) 2 is correct, and approves the nonce value.

Specifically, the block generator 24 stores, in the new block 51, image data and position information that are associated with each other and used at the time of generating a three-dimensional map (transaction data), and searches for a nonce value used to couple the new block 51 to a most recently coupled block 51. When the nonce value is found, verification is performed by another information processing apparatus (miner) 2. When the block generator 24 obtains an approval, the block generator 24 stores a destination of a reward for mining in the new block 51, and couples the new block 51 to the blockchain 5. The destination of a reward for mining is information regarding a miner having found a nonce value, and the miner having found the nonce value can receive a reward when the new block 51 is coupled to the most recently coupled block 51.

The block 51 stores therein a hash value of a most recently coupled block (a previous hash value in the figure), a nonce value used to couple the block 51 to the most recently coupled block 51, transaction data (image data and position information that are associated with each other), and a destination of a reward.

Blockchain data updated by the new block 51 being coupled to the most recently coupled block 51 is stored in the recording ledger DB 27.

As described above, the information processing apparatus 2 performs the use determination processing on image data, the three-dimensional map generation processing using image information, and the mining processing for recording, using a blockchain, image data used when a three-dimensional map is generated.

[Information Processing Method]

A flow of processing performed by the information processing system 1 is described with reference to FIGS. 5, 6A, 6B, 6C, 7, and 8.

Figure 5:
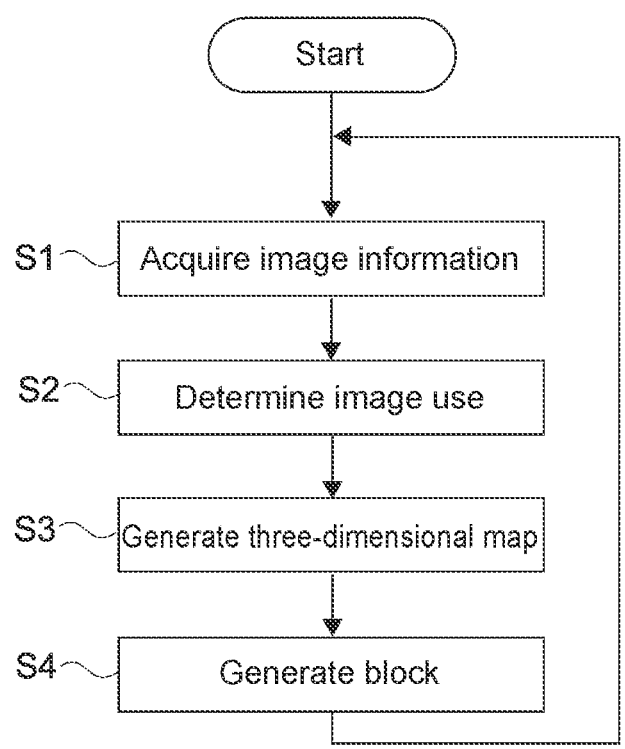
FIG. 5 is a flowchart illustrating an information processing method performed by the information processing apparatus.

FIG. 5 is a flowchart of information processing performed by the information processing apparatus 2. FIGS. 6A, 6B, 6C, 7, and 8 illustrate examples of a display screen displayed on the mobile terminal 4 of an end user.

First, image information (image data and position information that are associated with each other) is acquired by the mobile terminal 4 of an end user.

Figure 6:
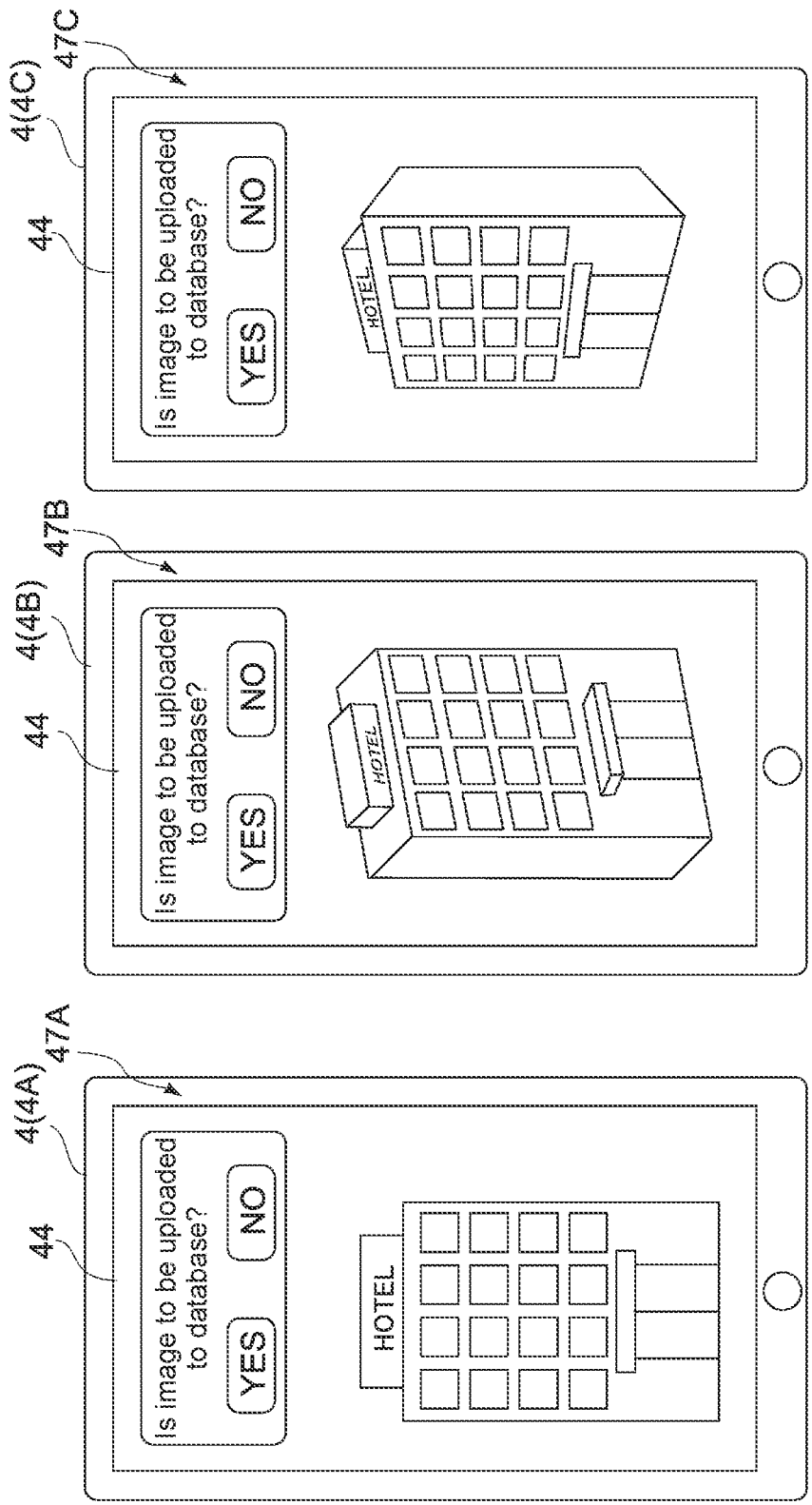
FIGS. 6A, 6B, and 6C illustrate examples of display screens respectively displayed on the mobile terminals of end users.

FIGS. 6A, 6B, and 6C are set of schematic plan views of the mobile terminals 4, where images 47A to 47C that are respectively acquired by the different mobile terminals 4A to 4C are displayed on the respective display sections 44 of the mobile terminals 4A to 4C. All of the images are images of the appearance of the same hotel, and the images are captured from different image-capturing directions. For example, the image 47A illustrated in FIG. 6A and acquired by the mobile terminal 4A is an image of a front face of the hotel that is captured from the front of the hotel. The image 47B illustrated in FIG. 6B and acquired by the mobile terminal 4B is an image captured in a state in which the hotel is viewed downward from the diagonally upper left, at an altitude higher than the altitude of the mobile terminal 4A. The image 47C illustrated in FIG. 6C and acquired by the mobile terminal 4C is an image captured in a state in which the hotel is viewed upward from the diagonally lower right, at the same altitude as the mobile terminal 4A.

For example, a comment that asks whether to perform an upload to the image-and-three-dimensional-map DB 26 is displayed on the display section 44, in addition to an upload-target image being displayed on the display section 44. An end user performs input of whether to perform the upload in response to the comment. When an input operation indicating that the upload is to be performed, image information is stored in the image-and-three-dimensional-map DB 26 of each information processing apparatus 2.

Next, as illustrated in FIG. 5, the image acquisition section 21 acquires image information (image data and position information that are associated with each other) stored in the image-and-three-dimensional-map DB 26 (S1).

Next, the image use determination section 22 performs an operation of verifying the acquired image data to determine whether to approve the image as a transaction, and further determines whether the image approved as a transaction is to be used to generate the three-dimensional map (S2).

Next, the three-dimensional map generator 23 generates the three-dimensional map on the basis of an image determined to be used to generate the three-dimensional map (S3).

Next, when another information processing apparatus 2 has already generated the three-dimensional map and has found a nonce value, the block generator 24 verifies and approves the nonce value. When the information processing apparatus 2 including the block generator 24 has generated a three-dimensional map and is the first to find a nonce value, the other information processing apparatus 2 performs verifies and approves the nonce value, and then, the block generator 24 generates a new block and couples the new block to a blockchain (S4). An updated partial three-dimensional map is stored in the image-and-three-dimensional-map DB 26 of the information processing apparatus 2. Updated blockchain data is stored in all of the recording ledgers DB 27 of the respective information processing apparatuses (miners) 2 participating in the generation of a three-dimensional map.

As described above, in the present embodiment, information regarding an image used to perform the three-dimensional map generation processing is recorded using a blockchain, and this results in difficulty in tracing back for falsification. This makes it possible to generate a highly reliable three-dimensional map.

Figure 7:
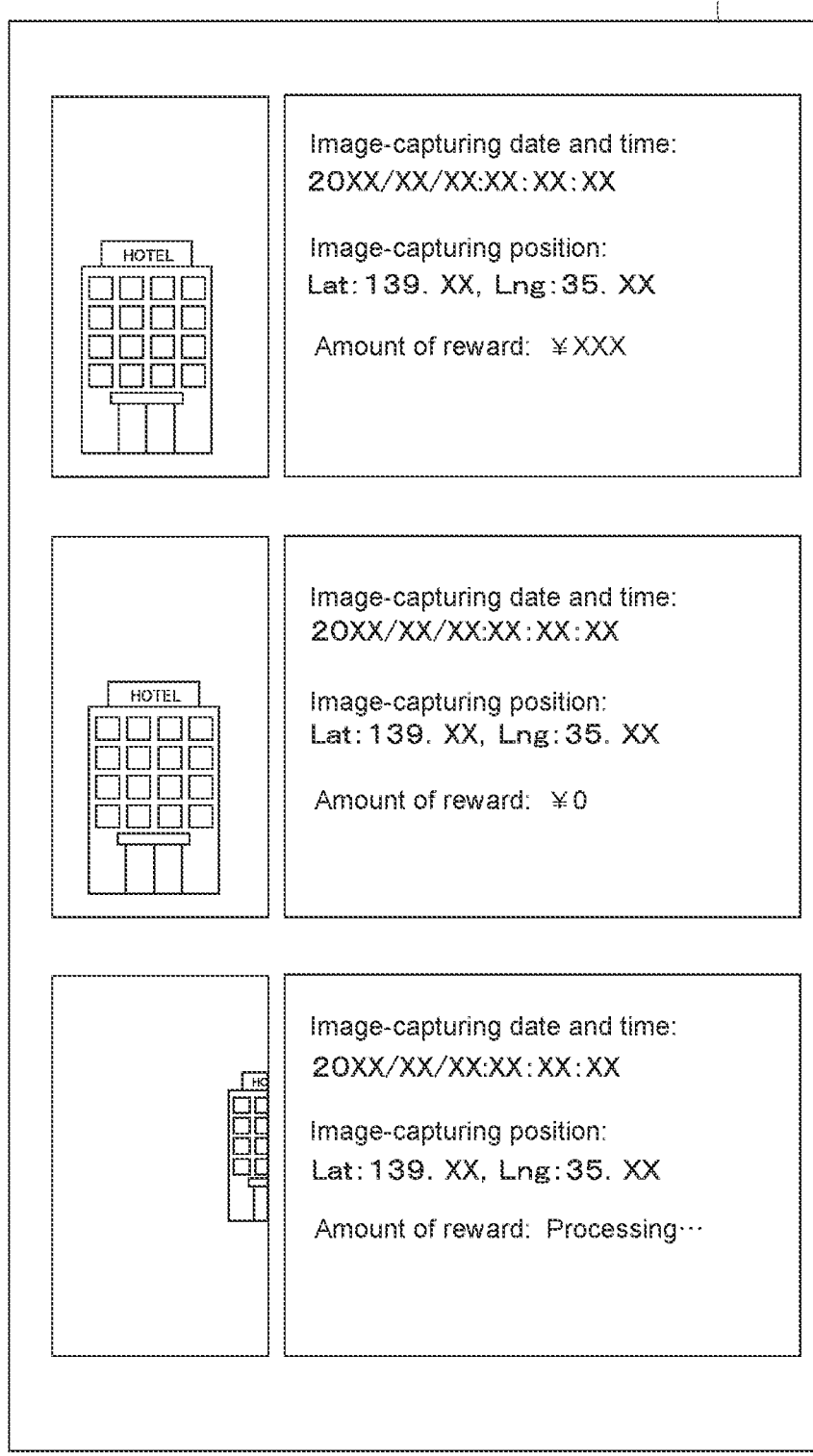
FIG. 7 illustrates an example of a display screen displayed on the mobile terminal of an end user.

An end user can upload one or more images. FIG. 7 illustrates an example of a display screen of the mobile terminal 4 when a user uploads, for example, three images. As illustrated in FIG. 7, information regarding an image-capturing position, information regarding an image-capturing date and time, and reward information that are associated with an image uploaded by an end user are displayed on the right of each image.

When an uppermost image in FIG. 7 is used to generate a three-dimensional map, an amount of reward is displayed in a field of the reward information. A middle image in FIG. 7 is an example of an image that has a high degree of similarity to the uppermost image and has not been used to generate the three-dimensional map. In this case, an amount of reward of JPY0 is displayed as the reward information since a reward is not paid. A lowermost image in FIG. 7 is an example of an image on which the image use determination section 22 is performing a use determination, and "processing" (during processing) is displayed in a field of the reward information.

As described above, using an image displayed on the mobile terminal 4, an end user can confirm if a reward has been paid as a result of the determination performed by the image use determination section 22.

As described above, when a three-dimensional map is generated, the three-dimensional map generator 23 estimates a position and an image-capturing direction (pose) of the mobile terminal 4 at the time of acquiring each piece of image data of a plurality of pieces of image data, on the basis of the plurality of pieces of image data.

Figure 8:
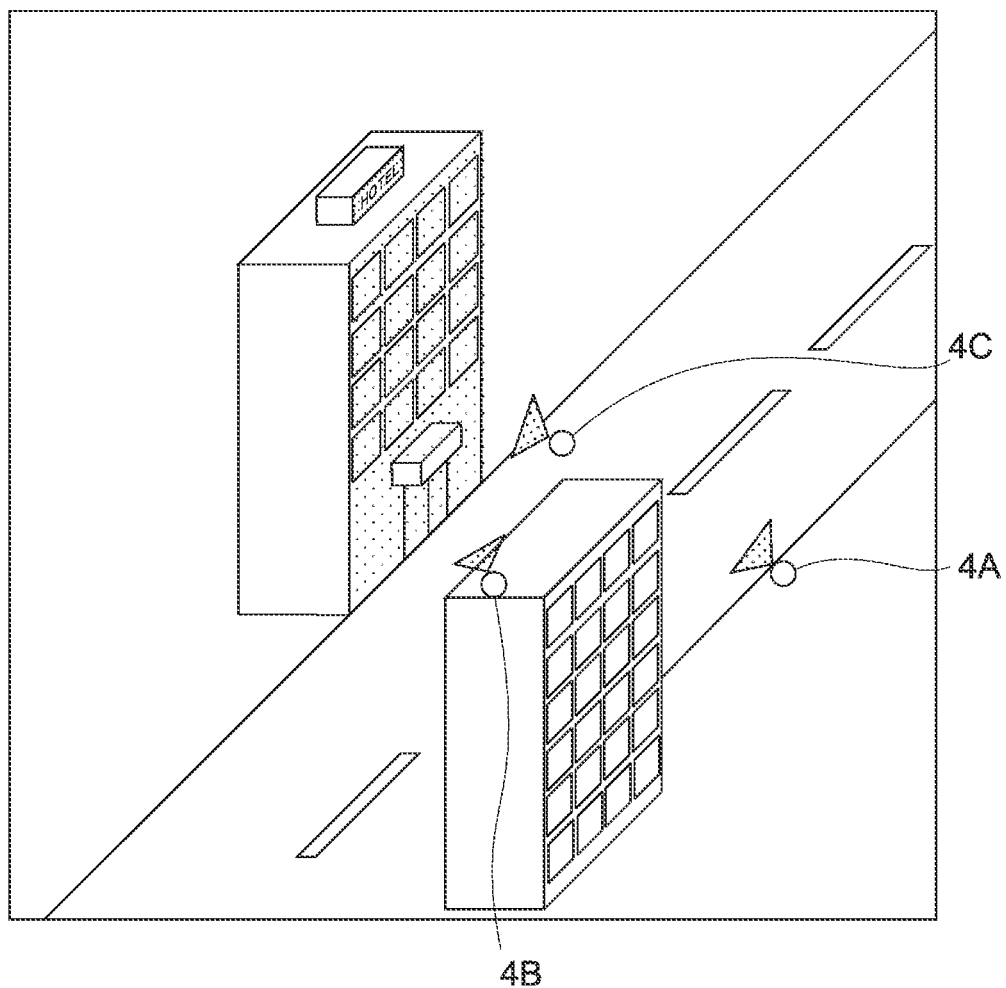
FIG. 8 illustrates an example of a confirmation screen for a modeling result.

FIG. 8 illustrates an example of a confirmation screen for a result of generating a three-dimensional map. In FIG. 8, a region for which a three-dimensional model is generated this time, and figures (a white circle and a triangle) that respectively indicate a position and an image-capturing direction (pose) of the mobile terminal 4 when image data used to generate the region is acquired are superimposed to be displayed on a three-dimensional map.

In FIG. 8, white circles respectively indicate image-capturing positions of the respective mobile terminals 4A to 4C when the captured images 47A to 47C illustrated in FIGS. 6A, 6B, and 6C are captured, and triangles filled with dots and illustrated for the respective mobile terminals 4A to 4C respectively indicate image-capturing directions. With respect to the triangle indicating an image-capturing direction, a direction from a vertex in contact with the white circle to an opposite side of the vertex is the image-capturing direction. When a three-dimensional map is generated, the positions and the image-capturing directions (poses) of the mobile terminals 4A to 4C are estimated on the basis of a plurality of pieces of image data acquired by the respective mobile terminals.

In FIG. 8, a region filled with dots and illustrated on the side of a front face of a hotel represents a region of which a three-dimensional image is generated using pieces of image data respectively acquired by the mobile terminals 4A to 4C.

As described above, the estimated image-capturing position and image-capturing direction on the confirmation screen illustrated in FIG. 8 are displayed using the figures, and display is performed such that a region of which a three-dimensional map is generated is recognized using image data. For example, the confirmation screen can be confirmed by an end user.

Note that, here, the example in which the number of images used to generate a three-dimensional map is three, has been described for convenience, but the number of images is not limited thereto.

As described above, in the present embodiment, a highly reliable three-dimensional map is generated by an end user group and a miner group using a blockchain, and a user of the three-dimensional map can grasp a state of a region of the three-dimensional map as necessary, using the three-dimensional map. Further, a three-dimensional map can be updated as necessary, and a user of the three-dimensional map can grasp a state change with respect to a region of the three-dimensional map as necessary, using the three-dimensional map.

For example, when a construction company corresponding to a user of a three-dimensional map monitors a three-dimensional map of a construction site on a regular basis, this enables the construction company to grasp how a state is changed over time with respect to, for example, the number of materials, earth and sand, and a shape of a building, and to perform construction work accurately and rapidly.

Further, in the present embodiment, image data used when a three-dimensional map is generated, and a miner and an end user having contributed toward generating the three-dimensional map are recorded using a blockchain. This makes it possible to grasp, using the records, a state of rewards paid to a miner and an end user.

Note that the effects described herein are not limitative but are merely illustrative, and other effects may be provided.

Embodiments of the present technology are not limited to the examples described above, and various modifications may be made thereto without departing from the scope of the present technology.

For example, the example in which image information uploaded by an end user is image data with position information, has been described in the embodiments above. In addition to this, the uploaded image information may include pose information obtained from, for example, a geomagnetic sensor. This results in there being no need to perform an operation of estimating, using a plurality of pieces of image data, an image-capturing direction (pose) of the mobile terminal when a three-dimensional map is generated. Further, a plurality of pieces of image data can be grouped for each image-capturing direction using pose information when, for example, there is a plurality of pieces of image data including the same position information, and this results in a reduction in an operation of removing an image having a low degree of similarity, or results in there being no need for the operation. This makes it possible to efficiently generate a three-dimensional map.

Further, the example in which a geomagnetic sensor is used as a pose information acquiring section has been described above, but pose information may be acquired using simultaneous localization and mapping (SLAM) that calculates a self-position from information regarding a feature point of a captured image). This results in there being no need to perform an operation of estimating, using a plurality of pieces of image data, an image-capturing direction (pose) of the mobile terminal when a three-dimensional map is generated.

Furthermore, the example in which the GPS is used as a position information acquiring section has been described in the embodiments above. However, position information may be acquired using Wi-Fi (registered trademark).

Further, the example in which each information processing apparatus (miner) includes the image-and-three-dimensional-map DB has been described in the embodiments above. However, the present technology is not limited thereto.

For example, a plurality of groups each including a plurality of information processing apparatuses (miners) may be provided, and a single image-and-three-dimensional-map DB may be shared in each group. In this case, image information, and partial three-dimensional maps generated by the respective information processing apparatuses belonging to the same group are stored in the single image-and-three-dimensional-map DB.

Further, each information processing apparatus (miner) may include a DB used to store image information, and a three-dimensional map may be stored in a single DB shared by a plurality of the information processing apparatuses (the miners). The DB in which a three-dimensional map is stored may be managed by, for example, the group 3 using the three-dimensional map.

Furthermore, the example in which, when a three-dimensional map is updated, a reward is paid to a miner having found a nonce value, and a reward is paid to an end user having provided an image used to generate the three-dimensional map, has been described in the embodiments above. However, the present technology is not limited thereto.

As an example, setting may be performed such that a reward will be paid for image data approved as a transaction even if the image data has a high degree of similarity and is not used to generate a three-dimensional map. In this case, an amount of reward is set to be lower than a reward for image data used to generate the three-dimensional map. This results in there being a need for larger volumes of image data at an early stage of the generation of the three-dimensional map. Thus, it is possible to encourage an end user to upload large volumes of image data while preventing the end user from uploading inappropriate image data such as data of a blurred image. Note that such a payment of a reward for image data that has been approved as a transaction but has not been used to generate a three-dimensional map may be stopped after the three-dimensional map is generated to a certain extent. A timing of stopping the payment of a reward may be set, with a period of time being limited in advance to, for example, three months from the start of map generation, or may be set according to a degree of completion of the generation of a three-dimensional map.

Further, as yet another example, a reward may be paid to miners when the company 30 corresponding to a user of a three-dimensional map uses the three-dimensional map, and the reward may be distributed to the miners.

Furthermore, there exists one piece of blockchain data for one group 3 in the embodiments described above. However, the present technology is not limited thereto. For example, when a three-dimensional map of a region that includes three villages is generated, a blockchain may be generated for each village. A plurality of blockchains for respective municipalities may be generated for one group 3.

Further, on the basis of a generated three-dimensional map, the information processing apparatus 2 may determine a region for which image data used to generate the three-dimensional map is insufficient, and the information processing apparatus 2 may notify an end user of the region. This makes it possible to encourage an end user to actively acquire image data for a region for which image data is insufficient, and thus to facilitate generating a three-dimensional map.

Note that the present technology may also take the following configurations.

(1) An information processing apparatus, including:
  an image acquisition section that acquires image information that includes image data and position information that are associated with each other, the position information being information regarding a position at which the image data is acquired;
  a three-dimensional model generator that generates a three-dimensional model using the image information; and
  a block generator that generates a new block that is to be coupled to a blockchain that is formed by blocks being coupled, each block recording therein the image information used to generate the three-dimensional model.

(2) The information processing apparatus according to (1), further including
  an image use determination section that verifies whether the image information is to be approved as a transaction, in which
  the three-dimensional model generator generates a three-dimensional model using the image information approved as a transaction.

(3) The information processing apparatus according to (2), in which
  the image use determination section determines whether the image information approved as a transaction is to be used to generate the three-dimensional model.

(4) The information processing apparatus according to (3), in which
on the basis of a degree of similarity of use-determination-target image data to image data used for the generation of a three-dimensional model, the image use determination section determines whether the use-determination-target image data is to be used to generate the three-dimensional model.

(5) The information processing apparatus according to any one of (2) to (4), in which
the image use determination section classifies a plurality of the pieces of image information using the pieces of position information.

(6) The information processing apparatus according to (5), in which
the three-dimensional model generator generates the three-dimensional model using the plurality of the pieces of image information classified using the pieces of position information.

(7) An information processing method, including:
acquiring unauthenticated image information that includes image data and position information that are associated with each other, the position information being information regarding a position at which the image data is acquired;
generating a three-dimensional model using the image information; and
generating a new block that is to be coupled to a blockchain that is formed by blocks being coupled, each block recording therein the image information used to generate the three-dimensional model.

(8) A program that causes an information processing apparatus to perform a process including:
acquiring image information that includes image data and position information that are associated with each other, the position information being information regarding a position at which the image data is acquired;
generating a three-dimensional model using the image information; and
generating a new block that is to be coupled to a blockchain that is formed by blocks being coupled, each block recording therein the image information used to generate the three-dimensional model.

(9) An information processing system, including
a plurality of information processing apparatuses each including
a three-dimensional model generator that generates a three-dimensional model using image information that includes image data and position information that are associated with each other, the position information being information regarding a position at which the image data is acquired, and
a block generator that generates a new block that is to be coupled to a blockchain that is formed by blocks being coupled, each block recording therein the image information used to generate the three-dimensional model.

REFERENCE SIGNS LIST

1 information processing system
2 information processing apparatus
5 blockchain
21 image acquisition section
22 image use determination section
23 three-dimensional map generator (three-dimensional model generator)
24 block generator
51 block

The invention claimed is:

1. An information processing apparatus, comprising:
an image acquisition section configured to acquire image information that includes image data associated with position information, wherein the position information is information regarding a position at which the image data is acquired;
an image use determination section configured to:
verify whether the image information is to be approved as a transaction;
determine whether the image information approved as the transaction is to be used to generate a three-dimensional model; and
determine, based on a degree of similarity of use-determination-target image data to the image data used for the generation of the three-dimensional model, whether the use-determination-target image data is to be used as the image information to generate the three-dimensional model;
a three-dimensional model generator configured to generate the three-dimensional model using the image information approved as the transaction; and
a block generator configured to generate a new block that is to be coupled to a blockchain, wherein each block in the blockchain records therein the image information used to generate the three-dimensional model.

2. The information processing apparatus according to claim 1, wherein the image use determination section is further configured to classify a plurality of pieces of the image information using pieces of the position information.

3. The information processing apparatus according to claim 2, wherein the three-dimensional model generator is further configured to generate the three-dimensional model using the plurality of pieces of the image information classified using the pieces of the position information.

4. An information processing method, comprising:
acquiring image information that includes image data associated with position information, wherein the position information is information regarding a position at which the image data is acquired;
verifying whether the image information is to be approved as a transaction;
determining whether the image information approved as the transaction is to be used to generate a three-dimensional model;
determining, based on a degree of similarity of use-determination-target image data to the image data used for the generation of the three-dimensional model, whether the use-determination-target image data is to be used as the image information to generate the three-dimensional model;
generating the three-dimensional model using the image information approved as the transaction; and
generating a new block that is to be coupled to a blockchain, wherein each block in the blockchain records therein the image information used to generate the three-dimensional model.

5. A non-transitory computer-readable medium having stored thereon computer-executable instructions, that when executed by a processor, cause the processor to execute operations, the operations comprising:
acquiring image information that includes image data associated with position information, wherein the position information is information regarding a position at which the image data is acquired;

verifying whether the image information is to be approved as a transaction;

determining whether the image information approved as the transaction is to be used to generate a three-dimensional model;

determining, based on a degree of similarity of use-determination-target image data to the image data used for the generation of the three-dimensional model, whether the use-determination-target image data is to be used as the image information to generate the three-dimensional model;

generating the three-dimensional model using the image information approved as the transaction; and generating a new block that is to be coupled to a blockchain, wherein each block in the blockchain records therein the image information used to generate the three-dimensional model.

6. An information processing system, comprising:

a plurality of information processing apparatuses, wherein each of the plurality of information processing apparatuses includes:

an image use determination section configured to:
verify whether image information is to be approved as a transaction, wherein the image information includes image data associated with position information, and the position information is information regarding a position at which the image data is acquired;
determine whether the image information approved as the transaction is to be used to generate a three-dimensional model; and
determine, based on a degree of similarity of use-determination-target image data to the image data used for the generation of the three-dimensional model, whether the use-determination-target image data is to be used as the image information to generate the three-dimensional model;

a three-dimensional model generator configured to generate the three-dimensional model using the image information approved as the transaction; and a block generator configured to generate a new block that is to be coupled to a blockchain, wherein each block in the blockchain records therein the image information used to generate the three-dimensional model.

* * * * *